United States Patent
Kambe et al.

(12)

(10) Patent No.: US 9,895,662 B2
(45) Date of Patent: Feb. 20, 2018

(54) METHOD FOR ENRICHING OXYGEN ISOTOPE

(71) Applicant: TAIYO NIPPON SANSO CORPORATION, Tokyo (JP)

(72) Inventors: Takashi Kambe, Tsuchiura (JP); Shigeru Hayashida, Kofu (JP); Takehiro Igarashi, Tokyo (JP)

(73) Assignee: TAIYO NIPPON SANSO CORPORATION, Tokyo (JP)

( * ) Notice: Subject to any disclaimer, the term of this patent is extended or adjusted under 35 U.S.C. 154(b) by 429 days.

(21) Appl. No.: 14/422,432

(22) PCT Filed: Oct. 1, 2013

(86) PCT No.: PCT/JP2013/076738
§ 371 (c)(1),
(2) Date: Feb. 19, 2015

(87) PCT Pub. No.: WO2014/061445
PCT Pub. Date: Apr. 24, 2014

(65) Prior Publication Data
US 2015/0217231 A1    Aug. 6, 2015

(30) Foreign Application Priority Data

Oct. 18, 2012 (JP) ................... 2012-230766

(51) Int. Cl.
*F25J 3/08* (2006.01)
*B01D 59/04* (2006.01)
(Continued)

(52) U.S. Cl.
CPC ............ *B01D 59/04* (2013.01); *B01D 3/14* (2013.01); *B01D 3/143* (2013.01); *B01D 59/50* (2013.01);
(Continued)

(58) Field of Classification Search
None
See application file for complete search history.

(56) References Cited

U.S. PATENT DOCUMENTS

| 6,321,565 | B1 | 11/2001 | Kihara et al. |
| 6,461,583 | B1 | 10/2002 | Hayashida et al. |
| 6,835,287 | B1 * | 12/2004 | Kihara ............... B01D 59/04 |
| | | | 202/154 |

FOREIGN PATENT DOCUMENTS

| CN | 1631768 | 6/2005 |
| CN | 1756586 | 4/2006 |

(Continued)

OTHER PUBLICATIONS

Russian Notice of Allowance issued in App. No. 2015108584 dated May 23, 2016 (w/ partial translation).

(Continued)

Primary Examiner — Neil N Turk
(74) Attorney, Agent, or Firm — Nixon & Vanderhye P.C.

(57) ABSTRACT

The present invention provides a method for enriching an oxygen isotope which enables the oxygen isotope to be enriched without requiring regular replenishment of large amounts of the nitric oxide raw material and with a small liquid NO hold-up volume, without reducing the separation efficiency for the oxygen isotope. By performing a chemical exchange between a water acquired by adding hydrogen to an oxygen having a crudely enriched oxygen isotope produced by a first distillation device, and a nitric oxide discharged from a second distillation device, a nitric oxide having an enriched concentration of the oxygen isotope and a water having a reduced concentration of the oxygen isotope are obtained, and the nitric oxide is supplied to the second distillation device, while an oxygen obtained by (Continued)

electrolysis of the water having a reduced concentration of the oxygen isotope is returned to the first distillation device.

7 Claims, 2 Drawing Sheets

(51) Int. Cl.
| | |
|---|---|
| *C01B 5/02* | (2006.01) |
| *F25J 3/02* | (2006.01) |
| *B01D 3/14* | (2006.01) |
| *C01B 5/00* | (2006.01) |
| *C01B 21/24* | (2006.01) |
| *C01B 13/02* | (2006.01) |
| *H01M 8/04119* | (2016.01) |
| *B01D 59/50* | (2006.01) |
| *C01B 3/00* | (2006.01) |
| *H01M 8/0662* | (2016.01) |
| *B01D 59/32* | (2006.01) |

(52) U.S. Cl.
CPC ............... *C01B 5/00* (2013.01); *C01B 5/02* (2013.01); *C01B 13/02* (2013.01); *C01B 21/24* (2013.01); *F25J 3/02* (2013.01); *F25J 3/08* (2013.01); *H01M 8/04156* (2013.01); *B01D 59/32* (2013.01); *H01M 8/0662* (2013.01)

(56) References Cited

FOREIGN PATENT DOCUMENTS

| CN | 2897371 | 5/2007 |
|---|---|---|
| CN | 101298025 | 11/2008 |
| EP | 1 923 126 | 5/2008 |
| JP | 03-047518 | 2/1991 |
| JP | 11-188240 | 7/1999 |
| JP | 2000-218134 | 8/2000 |
| JP | 2001-239101 | 9/2001 |
| RU | 2 446 862 | 4/2012 |
| WO | 00/27509 | 5/2000 |

OTHER PUBLICATIONS

Yang et al., "Journal of Isotopes," vol. 18, No. 1-2, May 31, 2005, with its Partial English language Translation.
The State Intellectual Property Office of P.R. China, "Office Action and Search Report," issued in connection with Chinese Patent Application No. 201380049562.9, dated Feb. 3, 2016, along with an English language Translation of the Search Report.
McInteer et al., "Nitric oxide distillation plant for isotope separation", *Industrial & Engineering Chemistry Process Design & Development*, vol. 4, No. 1, pp. 35-42 (1965).
International Search Report for PCT/JP2013/076738, dated Dec. 24, 2013, two pages.
Non-English Written Opinion of the ISA for PCT/JP2013/076738, dated Dec. 24, 2013, three pages.
Extended Eurolean Search Resort issued in App. No. 13847246.9 dated May 11, 2016.

* cited by examiner

METHOD FOR ENRICHING OXYGEN ISOTOPE

TECHNICAL FIELD

The present invention relates to a method for enriching an oxygen isotope which, when enriching a large amount of a specific oxygen isotope by distilling nitric oxide, enables the oxygen isotope to be enriched without requiring regular replenishment of large amounts of the nitric oxide raw material and with a small liquid NO hold-up volume, without reducing the separation efficiency for the oxygen isotope.

This application is the U.S. national phase of International Application No. PCT/JP2013/076738 filed Oct. 1, 2013 which designated the U.S. and claims priority to Japanese Patent Application No. 2012-230766, filed Oct 18, 2012, the contents of which are incorporated herein by reference.

BACKGROUND ART

Conventional methods for enriching an oxygen isotope ($^{17}O$ or $^{18}O$) employ a distillation method disclosed in Non-Patent Document 1 which uses nitric oxide (NO) as the raw material (hereafter referred to as the "NO distillation method"), a distillation method which uses water ($H_2O$) as the raw material (hereafter referred to as the "water distillation method"), a distillation method which uses oxygen ($O_2$) as the raw material (hereafter referred to as the "oxygen distillation method"), or a distillation method which uses carbon monoxide (CO) as the raw material (hereafter referred to as the "CO distillation method") or the like.

Table 1 is a comparison table comparing the NO distillation method, the water distillation method, the oxygen distillation method, and the CO distillation method.

TABLE 1

|  | NO distillation method | Water distillation method | Oxygen distillation method | CO distillation method |
| --- | --- | --- | --- | --- |
| Raw material | nitric oxide | water | oxygen | carbon monoxide |
| Operating pressure (bar) | 1 | 0.4 | 1 | 1 |
| Temperature (K) | 121 | 350 | 90 | 82 |
| Relative volatility | $^{14}N^{16}O/^{14}N^{18}O = 1.04$ | $H_2^{16}O/H_2^{18}O = 1.005$ | $^{16}O_2/^{16}O^{18}O = 1.006$ | $^{12}C^{16}O/^{12}C^{18}O = 1.006$ |

The relative volatility value corresponds with the separation factor. When the relative volatility is small, the number of theoretical stages necessary to achieve separation and enrichment of an oxygen isotope is approximately proportional to the inverse of (separation factor −1).

Consequently, as illustrated in Table 1, the NO distillation method enables the number of theoretical stages necessary for separation of an oxygen isotope to be reduced to about $\frac{1}{10}$ compared with the other distillation methods (specifically the water distillation method, the oxygen distillation method and the CO distillation method).

Accordingly, the NO distillation apparatus can be reduced in size, and the energy required for achieving separation of the oxygen isotope can be reduced.

DOCUMENTS OF RELATED ART

Patent Documents

Patent Document 1: Japanese Unexamined Patent Application, First Publication No. 2000-218134

Patent Document 2: Japanese Unexamined Patent Application, First Publication No. Hei 11-188240

Non-Patent Document

Non-Patent Document 1: B. B. McInteer and Robert M. Potter, "Nitric Oxide Distillation Plant for Isotope Separation", Industrial & Engineering Chemistry Process Design and Development, Vol. 4, No. 1, pp. 35 to 42 (1965).

SUMMARY OF THE INVENTION

Problems to be Solved by the Invention

However, the NO distillation apparatus used in the NO distillation method has a problem in that when the scale of the nitric oxide distillation is large, the liquid NO hold-up volume becomes quite large. Because nitric oxide is highly reactive, if the hold-up volume is large, then there is a possibility of a major disaster occurring if the nitric oxide were to leak.

Further, when the scale of the nitric oxide distillation is large, a large amount of the nitric oxide raw material must be prepared, which requires that a large amount of nitric oxide must be transported safely. In other words, handling of the nitric oxide raw material has proven to be complicated.

Accordingly, an object of the present invention is to provide a method for enriching an oxygen isotope which, when distilling a large amount of a nitric oxide raw material, enables a large amount of the oxygen isotope to be acquired without requiring regular replenishment of large amounts of the nitric oxide raw material and with a small liquid NO hold-up volume, without reducing the separation efficiency for the oxygen isotope.

Means to Solve the Problems

In order to achieve the above object, the present invention provides (1) a method for enriching an oxygen isotope which includes a step of acquiring an oxygen having a crudely enriched oxygen isotope by distilling a raw material oxygen using a first distillation device, a step of acquiring a water by hydrogenating the oxygen having a crudely enriched oxygen isotope, a step of acquiring a nitric oxide discharged upon distillation of a raw material nitric oxide using a second distillation device, and a nitric oxide and water acquisition step of performing a chemical exchange between the water and the discharged nitric oxide, thereby acquiring a nitric oxide having an enriched concentration of the oxygen isotope and a water having a reduced concentration of the oxygen isotope, wherein the nitric oxide having an enriched concentration of the oxygen isotope is supplied to the second distillation device, and an oxygen obtained by electrolysis of the water having a reduced concentration of the oxygen isotope is returned to the first distillation device.

Further, the present invention also provides (2) the method for enriching an oxygen isotope according to (1), wherein in the step of acquiring a water, the water is acquired by using a hydrogen fuel cell to react and add hydrogen to the oxygen having a crudely enriched oxygen isotope, and the electricity generated when the water is acquired by using the hydrogen fuel cell to react and add hydrogen to the oxygen having a crudely enriched oxygen isotope is used to perform the electrolysis of the water having a reduced concentration of the oxygen isotope.

Furthermore, the present invention also provides (3) the method for enriching an oxygen isotope according to (1) or (2), wherein in the step of acquiring an oxygen having a crudely enriched oxygen isotope, a first distillation column group having a plurality of distillation columns connected in a cascade is used as the first distillation device.

Further, the present invention also provides (4) the method for enriching an oxygen isotope according to any one of (1) to (3), wherein in the step of acquiring a nitric oxide, a second distillation column group having a plurality of distillation columns connected in a cascade is used as the second distillation device.

Moreover, the present invention also provides (5) a method for enriching an oxygen isotope which includes a step of acquiring a water crudely enriched with water containing an oxygen isotope by distilling a raw material water using a first distillation device, a step of acquiring a nitric oxide discharged upon distillation of a raw material nitric oxide using a second distillation device, and a step of performing a chemical exchange between the crudely enriched water and the discharged nitric oxide, thereby acquiring a nitric oxide having an enriched concentration of the oxygen isotope and a water having a reduced concentration of the oxygen isotope, wherein the nitric oxide having an enriched concentration of the oxygen isotope is supplied to the second distillation device, and the water having a reduced concentration of the oxygen isotope is returned to the first distillation device.

Further, the present invention also provides (6) the method for enriching an oxygen isotope according to (5), wherein in the step of acquiring a water crudely enriched with a water containing an oxygen isotope, a first distillation column group having a plurality of distillation columns connected in a cascade is used as the first distillation device.

Furthermore, the present invention also provides (7) the method for enriching an oxygen isotope according to (5) or (6), wherein in the step of acquiring a nitric oxide, a second distillation column group having a plurality of distillation columns connected in a cascade is used as the second distillation device.

Effects of the Invention

In the method for enriching an oxygen isotope according to the present invention, by subjecting an oxygen in which a target oxygen isotope has been crudely enriched by oxygen distillation to hydrogenation to form water, subjecting this water to a chemical exchange with a nitric oxide having a reduced concentration of the oxygen isotope obtained by distillation of a nitric oxide, and then returning the resulting nitric oxide having an enriched concentration of the oxygen isotope to the nitric oxide distillation device, a nitric oxide in which the target oxygen isotope has been enriched can be produced in a large amount without requiring regular replenishment of large amounts of the nitric oxide raw material and without reducing the separation efficiency, while reducing the hold-up volume of liquid nitric oxide compared with the case where the entire enrichment is performed by nitric oxide distillation.

EMBODIMENTS FOR CARRYING OUT THE INVENTION

Embodiments applying the present invention are described below in detail, with reference to the drawings. The drawings used in the following description are used merely to explain the configurations of the embodiments of the present invention, and the size, thickness, and dimensions and the like of the various devices and units that are illustrated may differ from the dimensional relationships found in the actual oxygen isotope enrichment apparatus.

First is a description of the principles and effects of the present invention.

In the present invention, a water containing an enriched oxygen isotope $^{18}O$ and/or $^{17}O$, and an NO gas (nitric oxide) having a lower concentration of the $^{18}O$ and/or $^{17}O$ compared with the water are subjected to gas-liquid contact to effect a chemical exchange reaction of the oxygen atoms.

In the present invention, the term "chemical exchange" means performing isotope exchange of oxygen atoms (O) between different chemical species, for example by subjecting $H_2O$ and NO to gas-liquid contact.

In water, the exchange reaction of oxygen isotopes occurs rapidly.

A nitric oxide having a reduced concentration of $^{18}O$, discharged upon NO distillation (namely, distillation using nitric oxide as a raw material), and an $H_2^{18}O$ (liquid) that has been crudely enriched by water distillation (distillation using water as a raw material) or oxygen distillation (distillation using oxygen as a raw material) are subjected to gas-liquid contact. The nitric oxide containing increased $^{18}O$ obtained as a result of the contact with the crudely enriched $H_2^{18}O$ is returned to the NO distillation. A similar exchange reaction can be performed in the case of $^{17}O$.

In the present invention, the term "crudely enriched" refers to an enrichment of the oxygen isotope of up to several percent from the natural abundance ratio.

In the present invention, by performing the oxygen isotope separation process described above, namely the process represented by [water distillation (or oxygen distillation) ↔ chemical exchange reaction ↔ NO distillation], a large amount of the oxygen isotope can be acquired with a small liquid NO hold-up volume, without reducing the separation efficiency for the oxygen isotope.

Further, by incorporating an isotope chemical exchange reaction step within the oxygen isotope separation process, only the nitric oxide extracted as a product from the NO distillation need be replenished (by a small flow of nitric oxide).

As a result, although it is necessary to distill a large amount of the raw material nitric oxide in order to obtain a large amount of the target oxygen isotope, there is no need to regularly prepare large amounts of the nitric oxide (raw material). Accordingly, better safety can be ensured.

(First Embodiment)

Figure 1:
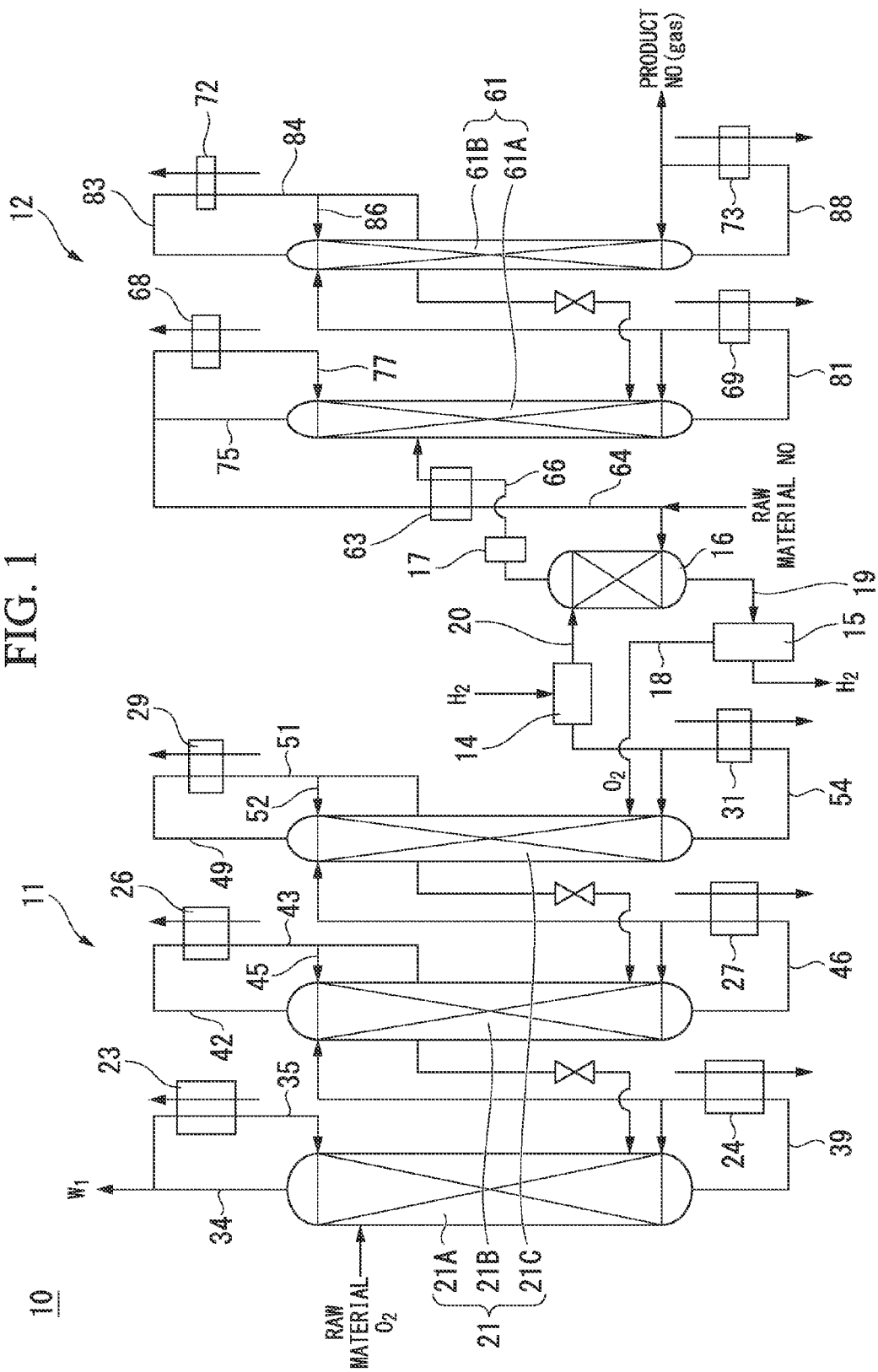
FIG. 1 is a diagram schematically illustrating the basic configuration of an oxygen isotope enrichment apparatus used for implementing a method for enriching an oxygen isotope according to a first embodiment of the present invention.

FIG. 1 is a diagram schematically illustrating the basic configuration of an oxygen isotope enrichment apparatus used for implementing a method for enriching an oxygen isotope according to a first embodiment of the present invention.

First is a description, with reference to FIG. 1, of the oxygen isotope enrichment apparatus 10 used for implementing the method for enriching an oxygen isotope according to the first embodiment.

The oxygen isotope enrichment apparatus 10 of the first embodiment has a first distillation device 11, a second distillation device 12, a hydrogenation unit 14, a water splitting unit 15, a chemical exchange column 16, a dewatering unit 17, an oxygen return line 18, a water return line 19, and a water supply line 20.

The first distillation device 11 is a device which performs a distillation using oxygen ($O_2$) as the raw material, and includes a first distillation column group 21, a first condenser 23, a first evaporator 24, a second condenser 26, a second evaporator 27, a third condenser 29, a third evaporator 31, overhead gas lines 34, 42 and 49, liquid return lines 35, 45 and 52, gas supply lines 39, 46 and 54, and liquid lines 43 and 51.

The first distillation column group 21 is constructed of first, second and third distillation columns 21A, 21B and 21C connected in a cascade. A cascade connection describes a structure in which the first, second and third distillation columns 21A, 21B and 21C are connected in series.

In order to continuously concentrate a specific component in the raw material, the first distillation column group 21 concentrates a specific component that has been concentrated in the first distillation column 21A in the second distillation column 21B, and then further concentrates this specific component that has been concentrated in the second distillation column 21B in the third distillation column 21C. This single continuous distillation process is called a cascade process.

In the first distillation column 21A, which is supplied with the raw material oxygen ($O_2$), the isotope concentration is low, and therefore a large amount of oxygen must be processed. The isotope concentration increases as a result of the distillation operation, and therefore the amount of oxygen processed within each column decreases sequentially for the second distillation column 21B and the third distillation column 21C.

Accordingly, the column diameter for the first distillation column 21A is the largest, and the column diameter for the third distillation column 21C is the smallest.

In FIG. 1, the case in which the first distillation column group 21 is composed of three distillation columns (the first, second and third distillation columns 21A, 21B and 21C) is described as one example of the first distillation column group 21, but the number of distillation columns within the first distillation column group 21 is not limited to three.

The first condenser 23 is provided within the overhead gas line 34, which is connected to the top section of the first distillation column 21A and is used for transporting a gas. The first condenser 23 is also connected to the liquid return line 35.

The first condenser 23 has a channel through which a heat transfer fluid is circulated. The first condenser 23 performs a heat exchange between the gas extracted from the top section of the first distillation column 21A and the heat transfer fluid, thereby cooling and liquefying the gas. The liquefied condensed liquid passes through the liquid return line 35 and is returned to the upper section of the first distillation column 21A.

The first evaporator 24 is provided within the gas supply line 39 that connects the bottom section of the first distillation column 21A and the upper section of the second distillation column 21B. The first evaporator 24 has a channel through which a heat transfer fluid is circulated.

The first evaporator 24 performs a heat exchange between the liquid extracted from the bottom section of the first distillation column 21A and the heat transfer fluid, thereby heating and volatilizing the liquid in a distillation operation. As a result, $^{18}O$ and $^{17}O$ are enriched at the bottom of the first distillation column 21A.

When the oxygen isotope enrichment apparatus 10 has a plurality of distillation columns (specifically the first, second and third distillation columns 21A, 21B and 21C) as illustrated in FIG. 1, the enrichment of $^{18}O$ and $^{17}O$ is still inadequate at this stage (following the first enrichment).

The oxygen containing the enriched $^{18}O$ and $^{17}O$ passes through the gas supply line 39 and is supplied to the upper section of the second distillation column 21B.

The second condenser 26 is provided within the overhead gas line 42, which is connected to the top section of the second distillation column 21B and is used for transporting a gas. The second condenser 26 is also connected to the liquid line 43.

The liquid return line 45 branches from the liquid line 43 and is connected to the upper section of the second distillation column 21B.

The second condenser 26 has a channel through which a heat transfer fluid is circulated. The second condenser 26 performs a heat exchange between the gas extracted from the top section of the second distillation column 21B and the heat transfer fluid, thereby cooling and liquefying the gas. The liquefied condensed liquid passes through the liquid line 43 and the liquid return line 45, and is returned to the upper section of the second distillation column 21B.

The second evaporator 27 is provided within the gas supply line 46 that connects the bottom section of the second distillation column 21B and the upper section of the third distillation column 21C. The second evaporator 27 has a channel through which a heat transfer fluid is circulated.

The second evaporator 27 performs a heat exchange between the liquid extracted from the bottom section of the second distillation column 21B and the heat transfer fluid, thereby heating and volatilizing the liquid, and generating a rising gas. As a result, $^{18}O$ and $^{17}O$ are enriched.

In this stage (the second enrichment), the $^{18}O$ and $^{17}O$ are enriched further, beyond the level achieved in the first enrichment. The oxygen containing the enriched $^{18}O$ and $^{17}O$ passes through the gas supply line 46 and is supplied to the upper section of the third distillation column 21C.

The third condenser 29 is provided within the overhead gas line 49, which is connected to the top section of the third distillation column 21C and is used for transporting a gas. The third condenser 29 is also connected to the liquid line 51.

The liquid return line 52 branches from the liquid line 51 and is connected to the upper section of the third distillation column 21C.

The third condenser 29 has a channel through which a heat transfer fluid is circulated. The third condenser 29 performs a heat exchange between the gas extracted from the top section of the third distillation column 21C and the heat transfer fluid, thereby cooling and liquefying the gas. The liquefied condensed liquid passes through the liquid line 51 and the liquid return line 52, and is returned to the upper section of the third distillation column 21C.

The third evaporator 31 is provided within the gas supply line 54 that connects the bottom section of the third distillation column 21C and the hydrogenation unit 14. The third evaporator 31 has a channel through which a heat transfer fluid is circulated.

The third evaporator 31 performs a heat exchange between the liquid extracted from the bottom section of the third distillation column 21C and the heat transfer fluid, thereby heating and volatilizing the liquid, and generating a rising gas containing enriched $^{18}O$ and $^{17}O$.

In this stage (the third enrichment), the $^{18}O$ and $^{17}O$ are enriched further, beyond the level achieved in the second enrichment. The oxygen containing the crudely enriched $^{18}O$ and $^{17}O$ passes through the gas supply line 54 and is supplied to the hydrogenation unit 14.

When oxygen distillation is performed using the first distillation device 11 of the configuration described above, a waste component $W_1$ is discharged from the top section of the first distillation column 21A.

The second distillation device 12 is a device which performs a distillation using nitric oxide (NO) as the raw material, and includes a second distillation column group 61, a heat exchanger 63, a gas return line 64, a raw material supply line 66, a fourth condenser 68, a fourth evaporator 69, a fifth condenser 72, a fifth evaporator 73, overhead gas lines 75 and 83, liquid return lines 77 and 86, a liquid supply line 81 to the fourth evaporator 69, a liquid line 84, and a liquid supply line 88 to the fifth evaporator 73.

The second distillation column group 61 is constructed of fourth and fifth distillation columns 61A and 61B connected in a cascade. In other words, in order to continuously concentrate a specific component in the raw material, the second distillation column group 61 concentrates a specific component that has been concentrated in the fourth distillation column 61A in the fifth distillation column 61B.

The fourth distillation column 61A to which the nitric oxide (NO) raw material is supplied has a greater distillation load than the fifth distillation column 61B. Accordingly, the column diameter of the fourth distillation column 61A is larger than the column diameter of the fifth distillation column 61B.

In FIG. 1, the case in which the second distillation column group 61 is composed of two distillation columns (in this case, the fourth and fifth distillation columns 61A and 61B) is described as one example of the second distillation column group 61, but the number of distillation columns within the second distillation column group 61 is not limited to two.

The heat exchanger 63 performs a heat exchange with an exhaust gas, thereby altering the temperature of the normal-temperature gas within the chemical exchange column 16 to a temperature close to that inside the fourth distillation column 61A (for example, a low temperature of approximately 120 K) prior to introduction of the gas into the distillation column 61A.

The gas return line 64 is a line through which the raw material nitric oxide (NO) is supplied, and also functions as a line for supplying the nitric oxide exhaust gas generated upon distillation of the nitric oxide to the bottom section of the chemical exchange column 16.

One end of the raw material supply line 66 is connected to the top section of the chemical exchange column 16, and the other end is connected to the upper section of the fourth distillation column 61A. The raw material supply line 66 supplies a nitric oxide having an enriched concentration of the oxygen isotopes ($^{18}O$ and $^{17}O$) to the fourth distillation column 61A that constitutes part of the second distillation device 12.

The fourth condenser 68 is provided within the overhead gas line 75, which is connected to the top section of the fourth distillation column 61A and is used for transporting a gas. The fourth condenser 68 is also connected to the liquid return line 77.

The fourth condenser 68 has a channel through which a heat transfer fluid is circulated. The fourth condenser 68 performs a heat exchange between the gas extracted from the top section of the fourth distillation column 61A and the heat transfer fluid, thereby cooling and liquefying the gas. The liquefied condensed liquid passes through the liquid return line 77 and is returned to the upper section of the fourth distillation column 61A.

The fourth evaporator 69 is provided within the gas supply line 81 that connects the bottom section of the fourth distillation column 61A and the upper section of the fifth distillation column 61B. The fourth evaporator 69 has a channel through which a heat transfer fluid is circulated.

The fourth evaporator 69 performs a heat exchange between the liquid extracted from the bottom section of the fourth distillation column 61A and the heat transfer fluid, thereby heating and volatilizing the liquid, and generating a rising gas. As a result, the concentration of the oxygen isotopes ($^{18}O$ and/or $^{17}O$) is enriched in the bottom section of the fourth distillation column 61A.

The nitric oxide (NO) containing the enriched oxygen isotopes ($^{18}O$ and/or $^{17}O$) passes through the gas supply line 81 and is supplied to the upper section of the fifth distillation column 61B.

The fifth condenser 72 is provided within the overhead gas line 83, which is connected to the top section of the fifth distillation column 61B and is used for transporting a gas. The fifth condenser 72 is also connected to the liquid line 84.

The liquid return line 86 branches from the liquid line 84 and is connected to the upper section of the fifth distillation column 61B.

The fifth condenser 72 has a channel through which a heat transfer fluid is circulated. The fifth condenser 72 performs a heat exchange between the gas extracted from the top section of the fifth distillation column 61B and the heat transfer fluid, thereby cooling and liquefying the gas. The liquefied condensed liquid passes through the liquid line 84 and the liquid return line 86, and is returned to the upper section of the fifth distillation column 61B.

The fifth evaporator 73 is provided within the gas supply line 88 connected to the bottom section of the fifth distillation column 61B. The fifth evaporator 73 has a channel through which a heat transfer fluid is circulated.

The fifth evaporator 73 performs a heat exchange between the liquid extracted from the bottom section of the fifth distillation column 61B and the heat transfer fluid, thereby heating and volatilizing the liquid, and generating a rising gas. As a result, the nitric oxide product ($N^{18}O$ and/or $N^{17}O$ (gas)) is enriched.

The hydrogenation unit 14 is connected to the upper section of the chemical exchange column 16 via the water supply line 20.

In the hydrogenation unit 14, hydrogen is added via the gas supply line 54 to the oxygen having the crudely enriched oxygen isotopes ($^{18}O$ and $^{17}O$), and a reaction is performed to produce water.

In the hydrogenation unit 14, the water may be obtained, for example, by using a hydrogen fuel cell to react the hydrogen with the oxygen having the crudely enriched oxygen isotopes. The resulting water is passed through the water supply line 20 and supplied to the upper section of the chemical exchange column 16.

The water splitting unit 15 is connected to the oxygen return line 18 and the water return line 19. Water in which the concentration of the oxygen isotopes ($^{18}O$ and $^{17}O$) has been reduced is supplied to the water splitting unit 15 from the bottom of the chemical exchange column 16 via the water return line 19.

In the water splitting unit 15, the water having the reduced oxygen isotope concentration is subjected to electrolysis. At this time, the electrolysis of the water having the reduced oxygen isotope concentration is performed using the electricity generated upon using the hydrogen fuel cell in the hydrogenation unit 14.

The water splitting unit 15 supplies the oxygen obtained upon electrolysis of the water having the reduced oxygen isotope concentration, through the oxygen return line 18, to the third distillation column 21C of the first distillation device 11.

The chemical exchange column 16 is disposed between the first distillation device 11 and the second distillation device 12. The top section of the chemical exchange column 16 is connected to the raw material gas supply line 66. The upper section of the chemical exchange column 16 is connected to the water supply line 20. The bottom section of the chemical exchange column 16 is connected to the gas return line 64.

Water is supplied to the chemical exchange column 16 via the water supply line 20, and the nitric oxide discharged from the second distillation device 12 is supplied to the chemical exchange column 16 via the gas return line 64.

In the chemical exchange column 16, the water supplied via the water supply line 20 and the nitric oxide discharged from the second distillation device 12 are subjected to a chemical exchange, thus acquiring a nitric oxide having an enriched concentration of the oxygen isotopes ($^{18}O$ and $^{17}O$) and a water having a reduced concentration of the oxygen isotopes ($^{18}O$ and $^{17}O$).

The dewatering unit 17 is provided within the raw material supply line 66 positioned between the chemical exchange column 16 and the heat exchanger 63. The dewatering unit 17 has the function of removing moisture contained within the nitric oxide gas following the chemical exchange.

One end of the oxygen return line 18 is connected to the water splitting unit 15, and the other end is connected to the lower section of the third distillation column 21C that constitutes part of the first distillation device 11.

The oxygen return line 18 returns the oxygen separated from the water by the water splitting unit 15 (specifically, the oxygen obtained by electrolysis of the water having a reduced concentration of the oxygen isotopes ($^{18}O$ and $^{17}O$)) to the first distillation device 11.

One end of the water return line 19 is connected to the bottom end of the chemical exchange column 16, and the other end is connected to the bottom section of the water splitting unit 15. The water return line 19 extracts the water having a reduced concentration of the oxygen isotopes ($^{18}O$ and $^{17}O$) from the bottom section of the chemical exchange column 16, and supplies that water to the bottom section of the water splitting unit 15.

One end of the water supply line 20 is connected to the hydrogenation unit 14, and the other end is connected to the upper section of the chemical exchange column 16. The water supply line 20 is a line that is used for supplying the water produced in the hydrogenation unit 14 to the upper section of the chemical exchange column 16.

In the oxygen isotope enrichment apparatus 10 having the structure described above, the product $N^{17}O$ is extracted from the middle of the fifth distillation column 61B, and the product $N^{18}O$ is extracted from the bottom section of the fifth distillation column 61B.

In FIG. 1, the extraction line for $N^{18}O$ is illustrated as an example.

Next is a description, with reference to FIG. 1, of the method for enriching an oxygen isotope according to the first embodiment, using the oxygen isotope enrichment apparatus 10 illustrated in FIG. 1.

First, using the first distillation device 11, a raw material oxygen is distilled to acquire an oxygen having crudely enriched oxygen isotopes ($^{18}O$ and $^{17}O$).

Specifically, the raw material oxygen is supplied to the first distillation column 21A, and using the first distillation column group 21 in which the first, second and third distillation columns 21A, 21B and 21C are connected in a cascade, the raw material oxygen is distilled. As a result, an oxygen having crudely enriched oxygen isotopes is produced. This oxygen having crudely enriched oxygen isotopes is supplied to the hydrogenation unit 14.

Subsequently, in the hydrogenation unit 14, hydrogen is added to the oxygen having crudely enriched oxygen isotopes to obtain water.

At this time, the water may be obtained in the hydrogenation unit 14, for example by using a hydrogen fuel cell to react the hydrogen with the oxygen having the crudely enriched oxygen isotopes ($^{18}O$ and $^{17}O$). The electricity generated upon using the hydrogen fuel cell to react the hydrogen with the oxygen having the crudely enriched oxygen isotopes can be used as the electricity required in the water splitting unit 15 when performing electrolysis of the water having a reduced concentration of the oxygen isotopes.

The water produced in the hydrogenation unit 14 is supplied through the water supply line 20 to the upper section of the chemical exchange column 16.

Next, by distilling a raw material nitric oxide using the second distillation device 12, product nitric oxides (specifically $N^{17}O$ and $N^{18}O$) are produced.

Specifically, the nitric oxide raw material is supplied to the fourth distillation column 61A, and the nitric oxide is distilled using the second distillation column group 61 in which the fourth and fifth distillation columns 61A and 61B are connected in a cascade.

The nitric oxide discharged from the second distillation device 12 is supplied to the bottom section of the chemical exchange column 16.

Next, by performing a chemical exchange in the chemical exchange column 16 between the water supplied via the water supply line 20 and the nitric oxide discharged from the second distillation device 12, a nitric oxide having an enriched concentration of the oxygen isotopes ($^{18}O$ and $^{17}O$) and a water having a reduced concentration of the oxygen isotopes ($^{18}O$ and $^{17}O$) are obtained.

The above-mentioned "chemical exchange" means performing an isotope exchange of oxygen atoms (O) between different chemical species, for example by subjecting $H_2O$ and NO to gas-liquid contact.

Subsequently, the nitric oxide produced in the chemical exchange column 16, having an enriched concentration of the oxygen isotopes ($^{18}O$ and $^{17}O$), is supplied to the upper section of the fourth distillation column 61A via the dewatering unit 17, the heat exchanger 63 and the raw material supply line 66.

Further, the water produced in the chemical exchange column 16, having a reduced concentration of the oxygen isotopes ($^{18}O$ and $^{17}O$), is supplied to the bottom section of the water splitting unit 15 via the water return line 19.

Next, the water having a reduced concentration of the oxygen isotopes ($^{18}O$ and $^{17}O$) is subjected to electrolysis in the water splitting unit 15. At this time, the electricity generated when using the hydrogen fuel cell in the hydrogenation unit 14 is used to perform the electrolysis of the water having a reduced concentration of the oxygen isotopes.

The water splitting unit 15 supplies the oxygen obtained upon electrolysis of the water having a reduced concentration of the oxygen isotopes to the third distillation column 21C of the first distillation device 11 via the oxygen return line 18.

The method for enriching an oxygen isotope according to the first embodiment has a step of acquiring an oxygen having crudely enriched oxygen isotopes ($^{18}O$ and $^{17}O$) by distilling a raw material oxygen using the first distillation device 11, a step of acquiring a water by adding hydrogen to the oxygen having crudely enriched oxygen isotopes ($^{18}O$ and $^{17}O$), a step of acquiring a nitric oxide which is discharged upon distillation of a raw material nitric oxide using a second distillation device, and which has a reduced concentration of the oxygen isotopes ($^{18}O$ and $^{17}O$), and a nitric oxide and water acquisition step of performing a chemical exchange between the aforementioned water and the discharged nitric oxide, thereby acquiring a nitric oxide having an enriched concentration of the oxygen isotopes and a water having a reduced concentration of the oxygen isotopes, wherein supplying the nitric oxide having an enriched concentration of the oxygen isotopes to the second distillation device 12, and returning an oxygen obtained by performing electrolysis of the water having a reduced concentration of the oxygen isotopes to the first distillation device 11 means that, when a large amount of the raw material nitric oxide is distilled, a large amount of the oxygen isotopes can be acquired without requiring regular replenishment of large amounts of the nitric oxide raw material and with a small liquid NO hold-up volume, without reducing the separation efficiency for the oxygen isotopes.

(Second Embodiment)

Figure 2:
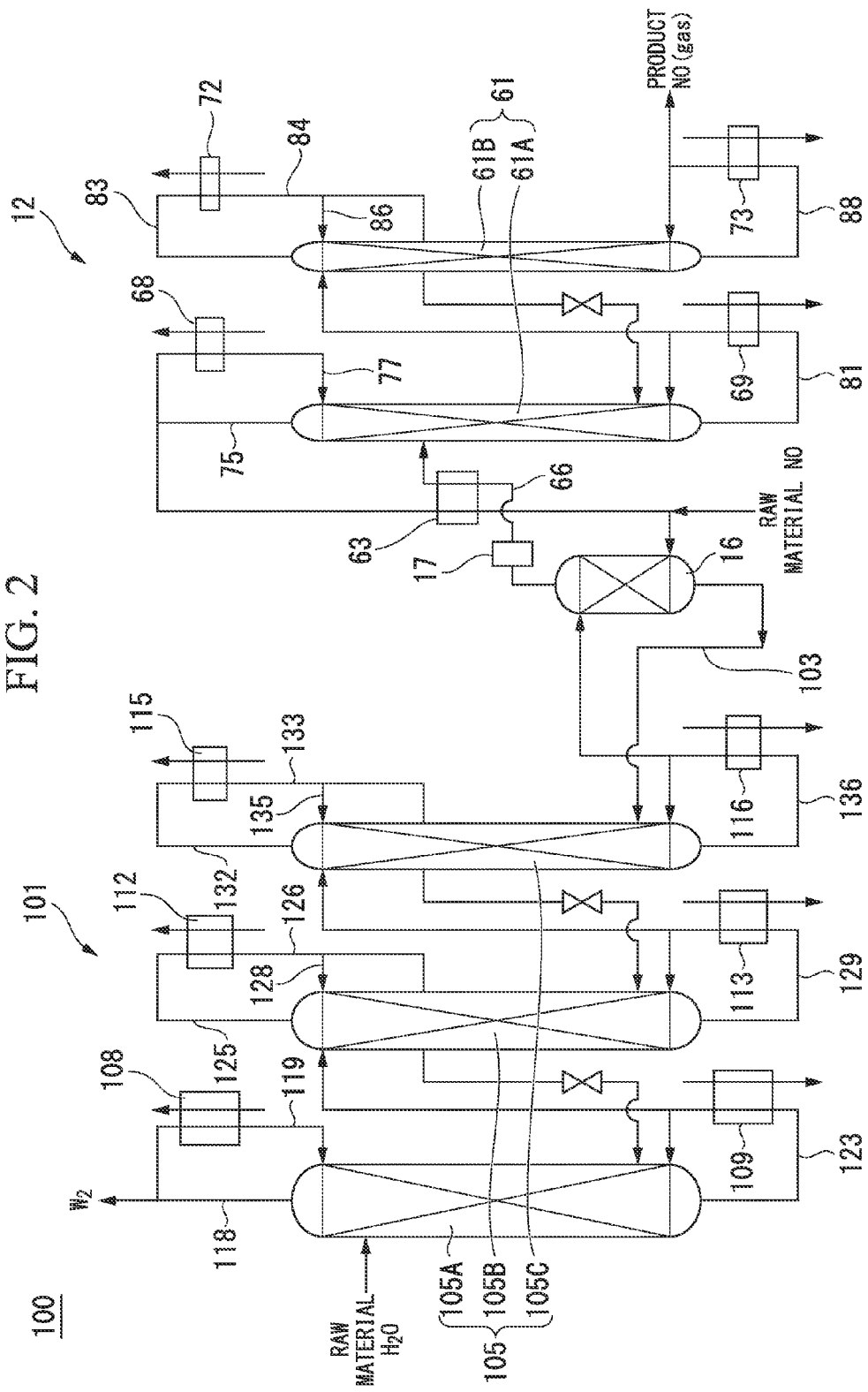
FIG. 2 is a diagram schematically illustrating the basic configuration of an oxygen isotope enrichment apparatus used for implementing a method for enriching an oxygen isotope according to a second embodiment of the present invention.

FIG. 2 is a diagram schematically illustrating the basic configuration of an oxygen isotope enrichment apparatus used for implementing a method for enriching an oxygen isotope according to a second embodiment of the present invention. In FIG. 2, those structural components that are the same as those of the oxygen isotope enrichment apparatus 10 of the first embodiment illustrated in FIG. 1 are labeled with the same reference signs.

First is a description, with reference to FIG. 2, of the oxygen isotope enrichment apparatus 100 used for implementing the method for enriching an oxygen isotope according to the second embodiment.

With the exceptions of providing the oxygen isotope enrichment apparatus 100 of the second embodiment with a first distillation device 101 instead of the first distillation device 11 provided in the oxygen isotope enrichment apparatus 10 of the first embodiment, as well as excluding the hydrogenation unit 14, the water splitting unit 15, the oxygen return line 18 and the water supply line 20 which constitute part of the oxygen isotope enrichment apparatus 10, and providing an additional water return line 103, the oxygen isotope enrichment apparatus 100 of the second embodiment is constructed in the same manner as the oxygen isotope enrichment apparatus 10.

The first distillation device 101 is a device which performs a distillation using water ($H_2O$) as the raw material, and includes a first distillation column group 105, a first condenser 108, a first evaporator 109, a second condenser 112, a second evaporator 113, a third condenser 115, a third evaporator 116, overhead gas lines 118, 125 and 132, liquid return lines 119, 128 and 135, gas supply lines 123, 129 and 136, and liquid lines 126 and 133.

The first distillation column group 105 is constructed of first, second and third distillation columns 105A, 105B and 105C connected in a cascade. In order to continuously concentrate a specific component in the raw material, the first distillation column group 105 concentrates a specific component that has been concentrated in the first distillation column 105A in the second distillation column 105B, further concentrates this specific component that has been concentrated in the second distillation column 105B in the third distillation column 105C.

In the first distillation column 105A, which is supplied with the raw material water ($H_2O$), the isotope concentration is low, and therefore a large amount of water must be processed. The isotope concentration increases as a result of the distillation operation, and therefore the amount of water processed within each column decreases sequentially for the second distillation column 105B and the third distillation column 105C. Accordingly, the column diameter for the first distillation column 105A is the largest, and the column diameter for the third distillation column 105C is the smallest.

In FIG. 2, the case in which the first distillation column group 105 is composed of three distillation columns (the first, second and third distillation columns 105A, 105B and 105C) is described as one example of the first distillation column group 105, but the number of distillation columns within the first distillation column group 105 is not limited to three.

The first condenser 108 is provided within the overhead gas line 118, which is connected to the top section of the first distillation column 105A and is used for transporting a gas. The first condenser 108 is also connected to the liquid return line 119.

The first condenser 108 has a channel through which a heat transfer fluid is circulated. The first condenser 108 performs a heat exchange between the gas extracted from the top section of the first distillation column 105A and the heat transfer fluid, thereby cooling and liquefying the gas. The liquefied condensed liquid passes through the liquid return line 119 and is returned to the upper section of the first distillation column 105A.

The first evaporator 109 is provided within the gas supply line 123 that connects the bottom section of the first distillation column 105A and the upper section of the second distillation column 105B. The first evaporator 109 has a channel through which a heat transfer fluid is circulated.

The first evaporator 109 performs a heat exchange between the liquid extracted from the bottom section of the first distillation column 105A and the heat transfer fluid, thereby heating and volatilizing the liquid to obtain a water containing enriched $^{18}O$ and $^{17}O$. At this stage (the first enrichment), the enrichment of $^{18}O$ and $^{17}O$ is still inadequate. This water containing enriched $^{18}O$ and $^{17}O$ passes through the gas supply line 123 and is supplied to the upper section of the second distillation column 105B.

The second condenser 112 is provided within the overhead gas line 125, which is connected to the top section of the second distillation column 105B and is used for transporting a gas. The second condenser 112 is also connected to the liquid line 126. The liquid return line 128 branches from the liquid line 126 and is connected to the upper section of the second distillation column 105B.

The second condenser 112 has a channel through which a heat transfer fluid is circulated. The second condenser 112 performs a heat exchange between the gas extracted from the top section of the second distillation column 105B and the heat transfer fluid, thereby cooling and liquefying the gas. The liquefied condensed liquid passes through the liquid line 126 and the liquid return line 128, and is returned to the upper section of the second distillation column 105B.

The second evaporator 113 is provided within the gas supply line 129 that connects the bottom section of the second distillation column 105B and the upper section of the third distillation column 105C. The second evaporator 113 has a channel through which a heat transfer fluid is circulated.

The second evaporator 113 performs a heat exchange between the liquid extracted from the bottom section of the second distillation column 105B and the heat transfer fluid, thereby heating and volatilizing the liquid to obtain a water containing enriched $^{18}O$ and $^{17}O$. In this stage (the second enrichment), the $^{18}O$ and $^{17}O$ are enriched further, beyond the level achieved in the first enrichment. The water containing the enriched $^{18}O$ and $^{17}O$ passes through the gas supply line 129 and is supplied to the upper section of the third distillation column 105C.

The third condenser 115 is provided within the overhead gas line 132, which is connected to the top section of the third distillation column 105C and is used for transporting a gas. The third condenser 115 is also connected to the liquid line 133. The liquid return line 135 branches from the liquid line 133 and is connected to the upper section of the third distillation column 105C.

The third condenser 115 has a channel through which a heat transfer fluid is circulated. The third condenser 115 performs a heat exchange between the gas extracted from the top section of the third distillation column 105C and the heat transfer fluid, thereby cooling and liquefying the gas. The liquefied condensed liquid passes through the liquid line 133 and the liquid return line 135, and is returned to the upper section of the third distillation column 105C.

The third evaporator 116 is provided within the gas supply line 136 that connects the bottom section of the third distillation column 105C and the chemical exchange column 16. The third evaporator 116 has a channel through which a heat transfer fluid is circulated.

The third evaporator 116 performs a heat exchange between the liquid extracted from the bottom section of the third distillation column 105C and the heat transfer fluid, thereby heating and volatilizing the liquid to obtain a water containing enriched $^{18}O$ and $^{17}O$. In this stage (the third enrichment), the $^{18}O$ and $^{17}O$ are enriched further, beyond the level achieved in the second enrichment. The water containing the enriched $^{18}O$ and $^{17}O$ passes through the gas supply line 136 and is supplied to the chemical exchange column 16.

When water distillation is performed using the first distillation device 101 of the configuration described above, a waste component $W_2$ is discharged from the top section of the first distillation column 105A.

One end of the water return line 103 is connected to the bottom end of the chemical exchange column 16, and the other end is connected to the lower section of the third distillation column 105C. The water return line 103 extracts water having a reduced concentration of the oxygen isotopes ($^{18}O$ and $^{17}O$) from the bottom end of the chemical exchange column 16, and supplies this water having a reduced concentration of the oxygen isotopes ($^{18}O$ and $^{17}O$) to the lower section of the third distillation column 105C.

In the oxygen isotope enrichment apparatus 100 of the second embodiment having the configuration described above, the water can be subjected to chemical exchange directly, and therefore the hydrogenation unit 14 and the water splitting unit 15 which were required in the oxygen isotope enrichment apparatus 10 of the first embodiment are unnecessary.

Accordingly, the oxygen isotope enrichment apparatus 100 of the second embodiment can be configured with a simpler construction than the oxygen isotope enrichment apparatus 10 of the first embodiment.

The concentration of the oxygen isotopes ($^{18}O$ and $^{17}O$) within the nitric oxide supplied to the second distillation device 12 is substantially the same as the concentration in the first embodiment.

Because the relative volatilities of the water isotopes and the relative volatilities of the oxygen isotopes (for example, $H_2^{18}O/H_2^{16}O$ and $^{16}O^{18}O/^{16}O^{16}O$) are almost the same, the oxygen isotope concentration within the water supplied to the chemical exchange column 16 is substantially the same as the oxygen isotope concentration within the water in the first embodiment obtained by adding hydrogen to the oxygen extracted from the first distillation device 11.

Next is a description, with reference to FIG. 2, of the method for enriching an oxygen isotope according to the second embodiment, using the oxygen isotope enrichment apparatus 100 illustrated in FIG. 2.

First, using the first distillation device 101, a raw material water is distilled to acquire a water having crudely enriched oxygen isotopes ($^{18}O$ and $^{17}O$).

Specifically, the raw material water is supplied to the first distillation column 105A, and using the first distillation column group 105 in which the first, second and third distillation columns 105A, 105B and 105C are connected in a cascade, the raw material water is distilled. As a result, a water having crudely enriched oxygen isotopes is produced. This water having crudely enriched oxygen isotopes is supplied to the upper section of the chemical exchange column 16 via the gas supply line 136.

Next, by distilling a raw material nitric oxide using the second distillation device 12, product nitric oxides (specifically $N^{17}O$ and/or $N^{18}O$) are obtained.

Specifically, the nitric oxide raw material is supplied to the fourth distillation column 61A, and the nitric oxide raw material is distilled using the second distillation column group 61 in which the fourth and fifth distillation columns 61A and 61B are connected in a cascade.

The nitric oxide discharged from the second distillation device 12 is supplied to the bottom section of the chemical exchange column 16.

Next, by performing a chemical exchange in the chemical exchange column 16 between the water having crudely enriched oxygen isotopes ($^{18}O$ and $^{17}O$) and the nitric oxide discharged from the second distillation device 12, a nitric oxide having an enriched concentration of the oxygen isotopes ($^{18}O$ and $^{17}O$) and a water having a reduced concentration of the oxygen isotopes ($^{18}O$ and $^{17}O$) are obtained.

The above-mentioned "chemical exchange" means performing an isotope exchange of oxygen atoms (O) between different chemical species, for example by subjecting $H_2O$ and NO to gas-liquid contact.

Subsequently, the nitric oxide produced in the chemical exchange column 16, having an enriched concentration of the oxygen isotopes ($^{18}O$ and $^{17}O$), is supplied to the upper section of the fourth distillation column 61A via the dewatering unit 17, the heat exchanger 63 and the raw material supply line 66.

Further, the water produced in the chemical exchange column 16, having a reduced concentration of the oxygen isotopes ($^{18}O$ and $^{17}O$), is supplied to the lower section of the third distillation column 105C via the water return line 103.

The method for enriching an oxygen isotope according to the second embodiment has a step of acquiring a water crudely enriched with water molecules containing the oxygen isotopes ($^{18}O$ and $^{17}O$) by distilling a raw material water using the first distillation device 101, a step of acquiring a nitric oxide discharged upon distillation of a raw material nitric oxide using the second distillation device 12, and a step of performing a chemical exchange between the crudely enriched water and the discharged nitric oxide, thereby acquiring a nitric oxide having an enriched concentration of the oxygen isotopes ($^{18}O$ and $^{17}O$) and a water having a reduced concentration of the oxygen isotopes ($^{18}O$ and $^{17}O$), wherein supplying the nitric oxide having an enriched concentration of the oxygen isotopes to the second distillation device 12, and returning the water having a reduced concentration of the oxygen isotopes to the first distillation device 101 means that, when a large amount of the raw material nitric oxide is distilled, a large amount of the oxygen isotopes can be acquired without requiring regular replenishment of large amounts of the nitric oxide raw material and with a small liquid NO hold-up volume, without reducing the separation efficiency for the oxygen isotopes.

While preferred embodiments of the present invention have been described and illustrated above, the invention is in no way limited by these specific embodiments, and various modifications and alterations can be made without departing from the spirit or scope of the present invention as defined in the appended claims.

EXAMPLES

Example

In the following example, the oxygen isotope enrichment apparatus 10 of the first embodiment illustrated in FIG. 1 was used to enrich the oxygen isotopes ($^{18}O$ and $^{17}O$).

In the example, the $^{17}O$ content contained within one nitric oxide product ($N^{17}O$) was at least 10 atom %, and the $^{18}O$ content contained within another nitric oxide product ($N^{18}O$) was at least 98 atom %.

In order to obtain the nitric oxide product ($N^{17}O$), a process was constructed for the oxygen isotope enrichment method that assumed the production of 5 ton per year of an enriched water containing hydrogenated $^{17}O$.

The method for enriching the oxygen isotopes according to the example is described below.

First, a raw material oxygen was supplied to the first distillation column 21A (supply volume: 5,500 $Nm^3/h$), and by distilling the raw material oxygen and enriching the oxygen isotopes ($^{18}O$ and $^{17}O$) using the first distillation column group 21 in which the first, second and third distillation columns 21A, 21B and 21C were connected in a cascade, an oxygen having the crudely enriched oxygen isotopes ($^{18}O$ and $^{17}O$) was produced.

At this point, when the concentrations of $^{17}O$ and $^{18}O$ in the bottom section of the third distillation column 21C were determined, the $^{17}O$ concentration was 2.23 atom % and the $^{18}O$ concentration was 26.1 atom %.

The production rate for the product obtained at this point, namely the nitric oxide containing the enriched oxygen isotopes, was 0.58 $Nm^3/h$.

Subsequently, the oxygen having the crudely enriched oxygen isotopes was supplied to the hydrogenation unit 14.

Next, in the hydrogenation unit 14, hydrogen was added to the oxygen having the crudely enriched oxygen isotopes to obtain a water, and this produced water was supplied to the upper section of the chemical exchange column 16 via the water supply line 20.

Next, by distilling a raw material nitric oxide using the second distillation device 12, the nitric oxide product (specifically, $N^{17}O$ and/or $N^{18}O$) was produced.

Subsequently, by performing a chemical exchange in the chemical exchange column 16 between the water supplied via the water supply line 20 and the nitric oxide (specifically, a nitric oxide obtained by mixing the exhaust gas nitric oxide (0.082 $Nm^3/h$) and a non-exhaust gas nitric oxide (0.035 $Nm^3/h$)), a nitric oxide having an enriched concentration of the oxygen isotopes ($^{18}O$ and $^{17}O$) and a water having a reduced concentration of the oxygen isotopes ($^{18}O$ and $^{17}O$) were obtained.

Following this chemical exchange, when the $^{17}O$ concentration within the $N^{17}O$ was determined, the result was 2 atom %. Further, when the $^{18}O$ concentration within the $N^{18}O$ was determined, the result was 23.6 atom %.

These were supplied to a second distillation device 12 having 300 stages. The $N^{17}O$ product was extracted from a middle position of the distillation column, and the $N^{18}O$ product was extracted from the bottom section of the distillation column.

When the amount of production of the water-$^{17}O$ ($H_2^{17}O$) required to obtain the $N^{17}O$ product was 5 ton per year, the amount of production of the water-$^{18}O$ required to obtain the $N^{18}O$ was 10 ton.

Subsequently, the water having the reduced concentration of the oxygen isotopes ($^{18}O$ and $^{17}O$) obtained following the chemical exchange was subjected to electrolysis, and the oxygen obtained as a result of this electrolysis was supplied to the first distillation device 11. At this time, the concentration of the oxygen isotopes within the oxygen was 0.8 atom % for $^{17}O$ and 2.6 atom % for $^{18}O$.

By supplying the oxygen generated by electrolysis of the water to the first distillation device 11 in this manner, the oxygen isotopes can be recovered, and the production of the oxygen isotopes can be performed without wasting energy during the enrichment of the raw material.

Further, in the present invention, only the amount of nitric oxide extracted as a product during the NO distillation need be replenished, and therefore the amount of replenishment was the same as the aforementioned production rate of 0.58 $Nm^3/h$.

When production was implemented using only the second distillation device 12, and the same production amounts of the oxygen isotopes were targeted, a distillation device having 1,200 stages (in other words, 1,200 cascade-connected distillation columns) and a supply rate for the raw material of 1,600 $Nm^3/h$ were necessary. Considering the liquid hold-up volume within the distillation columns, a very large amount of nitric oxide must be used.

Accordingly, based on the results of the above example, it was evident that the supply rate of the nitric oxide could be reduced dramatically, meaning the amount of nitric oxide that needed to be prepared as a raw material could also be reduced dramatically.

Furthermore, because the column diameter of the distillation columns that constitute the second distillation device 12 could be reduced, the liquid NO hold-up volume within the second distillation device 12 could be reduced to about 1/10 compared with an apparatus in which only NO distillation and enrichment was performed.

INDUSTRIAL APPLICABILITY

The present invention can be applied to a method for enriching an oxygen isotope which, when distilling a large amount of a nitric oxide raw material, enables the oxygen isotope to be enriched without requiring regular replenishment of large amounts of the nitric oxide raw material and with a small liquid NO hold-up volume, without reducing the separation efficiency for the oxygen isotope.

DESCRIPTION OF THE REFERENCE SIGNS 10, 100: Oxygen isotope enrichment apparatus
11, 101: First distillation device
12: Second distillation device
14: Hydrogenation unit
15: Water splitting unit
16: Chemical exchange column
17: Dewatering unit
18: Oxygen return line
19: Water return line
20: Water supply line
21, 105: First distillation column group
21A, 105A: First distillation column
21B, 105B: Second distillation column
21C, 105C: Third distillation column
23, 108: First condenser
24, 109: First evaporator
26, 112: Second condenser
27, 113: Second evaporator
29, 115: Third condenser
31, 116: Third evaporator
34, 42, 49, 75, 83, 118, 125, 132: Overhead gas line
35, 45, 52, 77, 86, 119, 128, 135: Liquid return line
39, 46, 54, 123, 129, 136: Gas supply line
43, 51, 84, 126, 133: Liquid line
61: Second distillation column group
61A: Fourth distillation column
61B: Fifth distillation column
63: Heat exchanger
64: Gas return line
66: Raw material supply line
68: Fourth condenser
69: Fourth evaporator
72: Fifth condenser
73: Fifth evaporator
81, 88: Liquid supply line
103: Water return line
$W_1$, $W_2$: Waste component

The invention claimed is:

1. A method for enriching an oxygen isotope comprising:
a first step of distilling a raw material oxygen using a first distillation device to acquire an oxygen having a crudely enriched oxygen isotope,
a second step of hydrogenating the oxygen having a crudely enriched oxygen isotope to acquire a first water by hydrogenating the oxygen having a crudely enriched oxygen isotope,
a third step of distilling a raw material nitric oxide using a second distillation device to acquire a product nitric oxide discharged upon distillation of a raw material nitric oxide using a second distillation device, and
a nitric oxide and water acquisition step of gas-liquid contacting and exchanging an oxygen isotope between the first water acquired in the second step and the product nitric oxide acquired in the third step to acquire an enriched nitric oxide having an enriched concentration of the oxygen isotope and a second water having a reduced concentration of the oxygen isotope,
an electrolysis step of subjecting the second water having a reduced concentration of the oxygen isotope to electrolysis to acquire an oxygen, wherein
the enriched nitric oxide having an enriched concentration of the oxygen isotope is supplied to the second distillation device, and the oxygen acquired by the electrolysis step is returned to the first distillation device.

2. The method for enriching an oxygen isotope according to claim 1, wherein in the second step of hydrogenating the oxygen having a crudely enriched oxygen isotope, the first water is acquired by using a hydrogen fuel cell to react and add hydrogen to the oxygen having a crudely enriched oxygen isotope, and
electricity that is generated when the first water is acquired by using the hydrogen fuel cell to react and add hydrogen to the oxygen having a crudely enriched oxygen isotope is used to perform the electrolysis of the second water having a reduced concentration of the oxygen isotope.

3. The method for enriching an oxygen isotope according to claim 1, wherein in the first step of distilling a raw material oxygen using a first distillation device, a first distillation column group having a plurality of distillation columns connected in a cascade is used as the first distillation device.

4. The method for enriching an oxygen isotope according to claim 1, wherein in the third step of distilling a raw material nitric oxide using a second distillation device, a second distillation column group having a plurality of distillation columns connected in a cascade is used as the second distillation device.

5. A method for enriching an oxygen isotope comprising:
a first step of distilling a raw material water using a first distillation device to acquire a first water crudely enriched with water molecules containing an oxygen isotope,
a second step of distilling a raw material nitric oxide using a second distillation device to acquire a product nitric oxide, and
a third step of gas-liquid contacting and exchanging an oxygen isotope between the crudely enriched first water acquired in the first step and the product nitric oxide acquired in the second step to acquire an enriched nitric oxide having an enriched concentration of the oxygen isotope and a second water having a reduced concentration of the oxygen isotope, wherein
the enriched nitric oxide having an enriched concentration of the oxygen isotope is supplied to the second distillation device, and the second water having a reduced concentration of the oxygen isotope is returned to the first distillation device.

6. The method for enriching an oxygen isotope according to claim 5, wherein in the first step of distilling a raw material oxygen using a first distillation device, a first distillation column group having a plurality of distillation columns connected in a cascade is used as the first distillation device.

7. The method for enriching an oxygen isotope according to claim 5, wherein in the second step of distilling a raw material nitric oxide using a second distillation device, a second distillation column group having a plurality of distillation columns connected in a cascade is used as the second distillation device.

* * * * *